(12) United States Patent
Chang

(10) Patent No.: US 7,376,100 B2
(45) Date of Patent: May 20, 2008

(54) CHANNEL ASSIGNING METHOD FOR AD-HOC NETWORK

(75) Inventor: Ching-Kang Chang, Kaohsiung (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 418 days.

(21) Appl. No.: 11/106,437

(22) Filed: Apr. 15, 2005

(65) Prior Publication Data

US 2006/0083197 A1    Apr. 20, 2006

(30) Foreign Application Priority Data

Oct. 20, 2004    (TW) .............................. 93131832 A

(51) Int. Cl.
*H04B 7/212* (2006.01)
(52) U.S. Cl. .................. 370/329; 370/335; 370/342
(58) Field of Classification Search ................ 370/329, 370/335, 338, 342, 431, 462
See application file for complete search history.

(56) References Cited

U.S. PATENT DOCUMENTS

| | | | |
|---|---|---|---|
| 2003/0012176 A1* | 1/2003 | Kondylis et al. ............ | 370/348 |
| 2003/0142645 A1* | 7/2003 | Belcea ........................ | 370/330 |
| 2004/0018839 A1* | 1/2004 | Andric et al. ................ | 455/433 |
| 2004/0100929 A1* | 5/2004 | Garcia-Luna-Aceves .... | 370/338 |
| 2005/0058181 A1* | 3/2005 | Lyle et al. ................... | 375/133 |
| 2006/0067283 A1* | 3/2006 | So et al. ...................... | 370/338 |

* cited by examiner

*Primary Examiner*—Edward F. Urban
*Assistant Examiner*—Adeel Haroon
(74) *Attorney, Agent, or Firm*—Bacon & Thomas, PLC

(57) ABSTRACT

A channel assigning method for ad-hoc networks, which uses an intra-cluster bandwidth reserving procedure, including six phases of reservation request RREQ, reservation response RRSP, code assignment CASN, code conflict detection CCD, code conflict report CCR and code confirmation CCFM, and an inter-cluster RTS-CTS (request to send-clear to send) dialogue protocol to generate a TDMA time slot and select an assignment code, thereby supporting real-time traffic and associated QoS guarantee in a multi-hop ad-hoc network.

16 Claims, 10 Drawing Sheets

| Cluster | Node |
|---|---|
| 61 | N1, N2, N3 |
| 62 | N4, N5 |
| 63 | N6, N7, N8 |
| 64 | N9, N10, N11 |

| Phase | Common code | | | Assignment code | | Common code | Result |
|---|---|---|---|---|---|---|---|
| | RREQ | RRSP | CASN | CCD | CCR | CCFM | |
| N1 | S | | | | | | B |
| N2 | R, R | | | | | | I |
| N3 | S | | | | | | B |
| N4 | R | S | S(C1) | | | | B |
| N5 | S | R | R (C1) | S | | | B |
| N6 | S | R | R(C1) | S | R | | T |
| N7 | R | S | S(C1) | R | R | | R |
| N8 | | R | R | | | | I |
| N9 | S | | R | | | R | I |
| N10 | S | R | S(C2) | S | | S | T |
| N11 | R | S | R | R | | R | R |

S:Send  R:Receive  B:Blocked  I:Idle  T:Transmit

Cluster I   Cluster J (A)

Cluster I   Cluster J
(B)

CHANNEL ASSIGNING METHOD FOR AD-HOC NETWORK

BACKGROUND OF THE INVENTION

1. Field of the Invention

The invention relates to a technical field of ad-hoc networks and, more particularly, to a channel assigning method for supporting real-time traffic in an ad-hoc network.

2. Description of Related Art

Currently, mobile ad-hoc network is one of the well-developed wireless networks. In fact, mobile ad-hoc networks consist of distributed mobile nodes that communicate with one another. As compared to other networks such as mobile phone networks or satellite networks, ad-hoc networks are characterized in having no fixed infrastructure but mobile nodes only. With the capability of transmission in a limited area, a node can be a relay to forward its neighbors' data. Accordingly, a network is generated by communication among the mobile nodes and its topology is changed dynamically when mobile nodes leave or join the network. Thus, ad-hoc networks have relative flexibility and robustness for strict environments without using a fixed infrastructure. For example, an ad-hoc network can be deployed rapidly in a battlefield or a natural disaster area subjected by, such as an earthquake, thereby providing required communication services.

In the cited ad-hoc networks, an effective communication distance between two mobile nodes is referred to as a hop. Because effective communication distance of each mobile node is limited, when two mobile nodes have a distance greater than the effective communication distance and intent to establish a communication connection, other mobile nodes between the two mobile nodes are used as relays to forward data, which forms a multi-hop environment. A typical wireless network such as a mobile phone network can easily realize bandwidth reservation because its infrastructure allows all communication requirements of mobile phones to be obtained by corresponding base stations. However, an ad-hoc network has complicated scheduling for obtained channels because of no collective resource control and allocation mechanism. Further, the ad-hoc network is operated in an open wireless communication platform that can incur interference. Accordingly, it is not easy to carry out QoS guarantee to support real-time traffic as establishing required connection and bandwidth reservation in a multi-hop network. The ad-hoc network has to apply distributed computation for obtaining required control function. In this case, the distributed computation needs to arrange the ad-hoc network into a hierarchical configuration. Therefore, a clustered ad-hoc network configured by grouping mobile nodes is widely used. As shown in FIG. 1, each cluster 11 typically consists of nearby mobile nodes 12. Mobile nodes 12 in a same cluster 11 can communicate with one another and one of two adjacent clusters 11 has at least one mobile node 12 as a gateway node to communicate with the other cluster 11.

Time division multiple access (TDMA) technique is applied to common wireless channels among mobile nodes 12 in the ad-hoc network for bandwidth allocation. Namely, a channel substantially has a time slot and a code. When a link is established, a transmitting node 121 and a receiving node 123 communicate with each other using a same code in an allocated time slot, thereby transmitting and receiving packets. A challenge of such an ad-hoc network is in that how channels are allocated appropriately among the clusters 11 to ensure data transmission success without collision, and also channel utilization rate is increased to enhance system performance.

A code is assigned to a match with respect to a mobile node 12, for arranging a common channel. If the number of available codes is greater than the number of mobile nodes 12, every mobile node 12 can have an assignment code. In this case, communication is achieved by two ways: receiver-based code assignment (RCA) that a transmitting terminal communicates with a receiving terminal based on a code of the receiving terminal; and transmitter-based code assignment (TCA) that a receiving terminal receives data from a transmitting terminal based on a code of the transmitting terminal. However, in typically ad-hoc networks, the number of available codes is usually smaller than the number of mobile nodes 12, and thus to use the codes repeatedly and effectively becomes an important subject.

In addition, as shown in FIG. 1, in the ad-hoc network, two nodes 121 and 122 having an ineffective communication distance from each other may send packets to a node 123 concurrently, which thus causes a head-on collision, or the node 121 sends a packet to the node 124 and the node 122 sends a packet to the node 123, which causes a side-way collision. Thus, a hidden terminal problem is encountered which needs to be overcome in system design.

SUMMARY OF THE INVENTION

An object of the invention is to provide a channel assigning method for supporting real-time transmission in an ad-hoc network.

Another object of the invention is to provide a channel assigning method, which can avoid the code collision, hidden terminal problem and interference, thereby achieving preferred code utilization.

To achieve the object, a channel assigning method for ad-hoc network is provided. The ad-hoc network has multiple mobile nodes grouped into clusters, each cluster defining: one of its mobile nodes as a cluster head that has a one-hop distance from any of other mobile nodes in the same cluster; a wireless channel between transmitting and receiving mobile nodes to transmit and receive packets, wherein the wireless channel is defined by a slot and a code, and the slot consists of a control slot and an information slot such that a mobile node transmits and receives control packets in the control slot for contention so as to transmit and receive data packets in the information slot; and a common code such that all mobile nodes in the same cluster use the common code to transmit and receive their packets. When a mobile node intends to transmit data to a mobile node in a same cluster, the method performs an intra-cluster procedure, which comprises: a reservation request (RREQ) phase in which the transmitting mobile node sends a RREQ packet for reserving required information slot; a reservation response (RRSP) phase in which a receiving mobile node acknowledges the RREQ packet by responding an RRSP packet; a code assignment (CASN) phase in which the cluster head that receives the RRSP packet assigns an assignment code to the transmitting and receiving mobile nodes; a code conflict detection (CCD) phase in which the transmitting mobile nodes, which are assigned with the assignment code, use the assignment code to send a hello message to its one-hop neighbors for finding possible collisions caused by the assignment code; the receiving mobile nodes acknowledge the possible collisions respectively; and a code confirmation (CCFM) phase in which the transmitting mobile node that has no collision responses an acknowledgement to the cluster head for confirming the assignment code and establishing a reservation channel.

Other objects, advantages, and novel features of the invention will become more apparent from the following detailed description when taken in conjunction with the accompanying drawings.

BRIEF DESCRIPTION OF THE DRAWINGS

FIG. 8 is an exemplary table of a six-phase operation in a local sub-control slot according to the invention;

DETAILED DESCRIPTION OF THE PREFERRED EMBODIMENT

Figure 1:
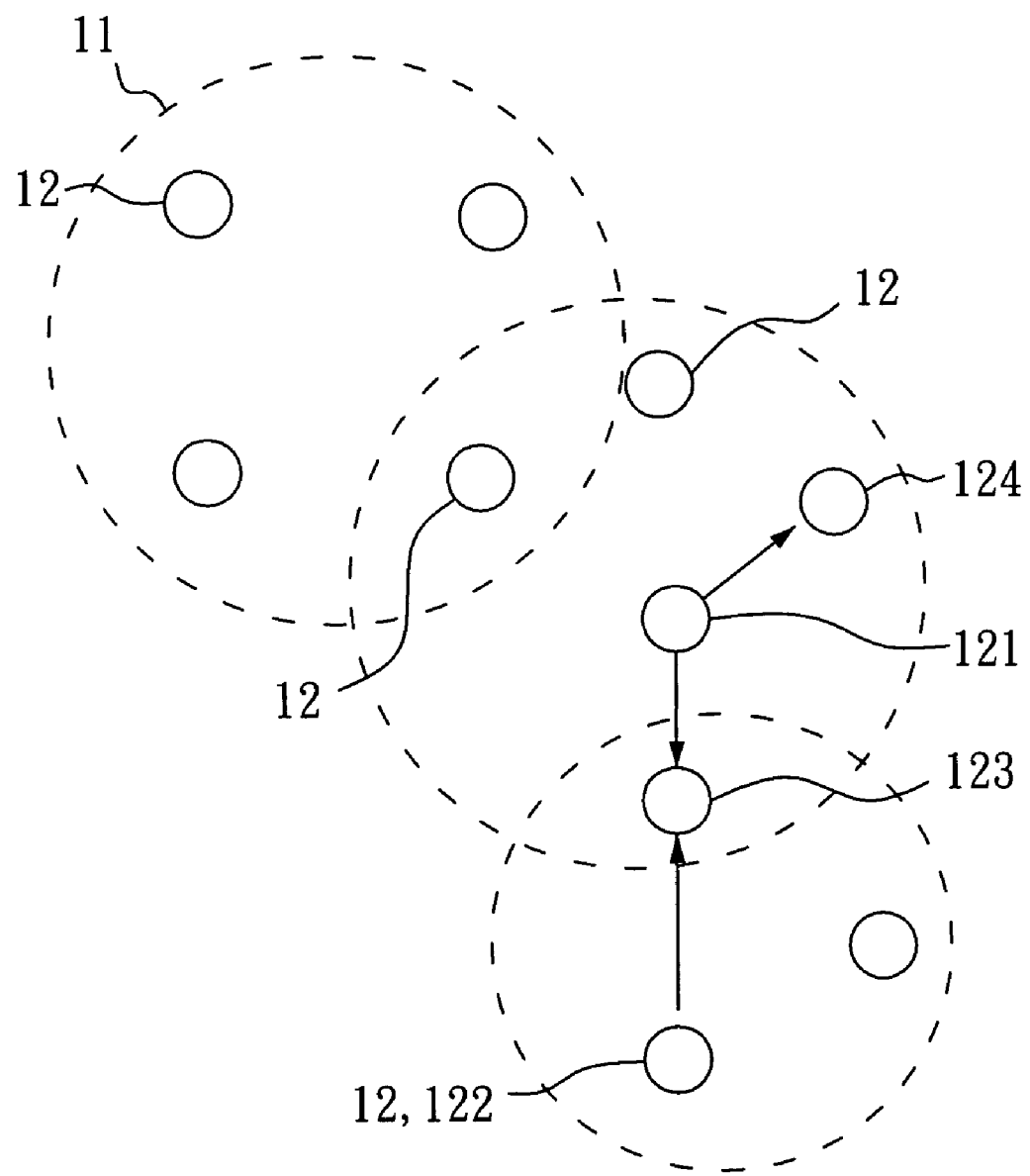
FIG. 1 is a graph of a typical clustered ad-hoc network.
Figure 2:
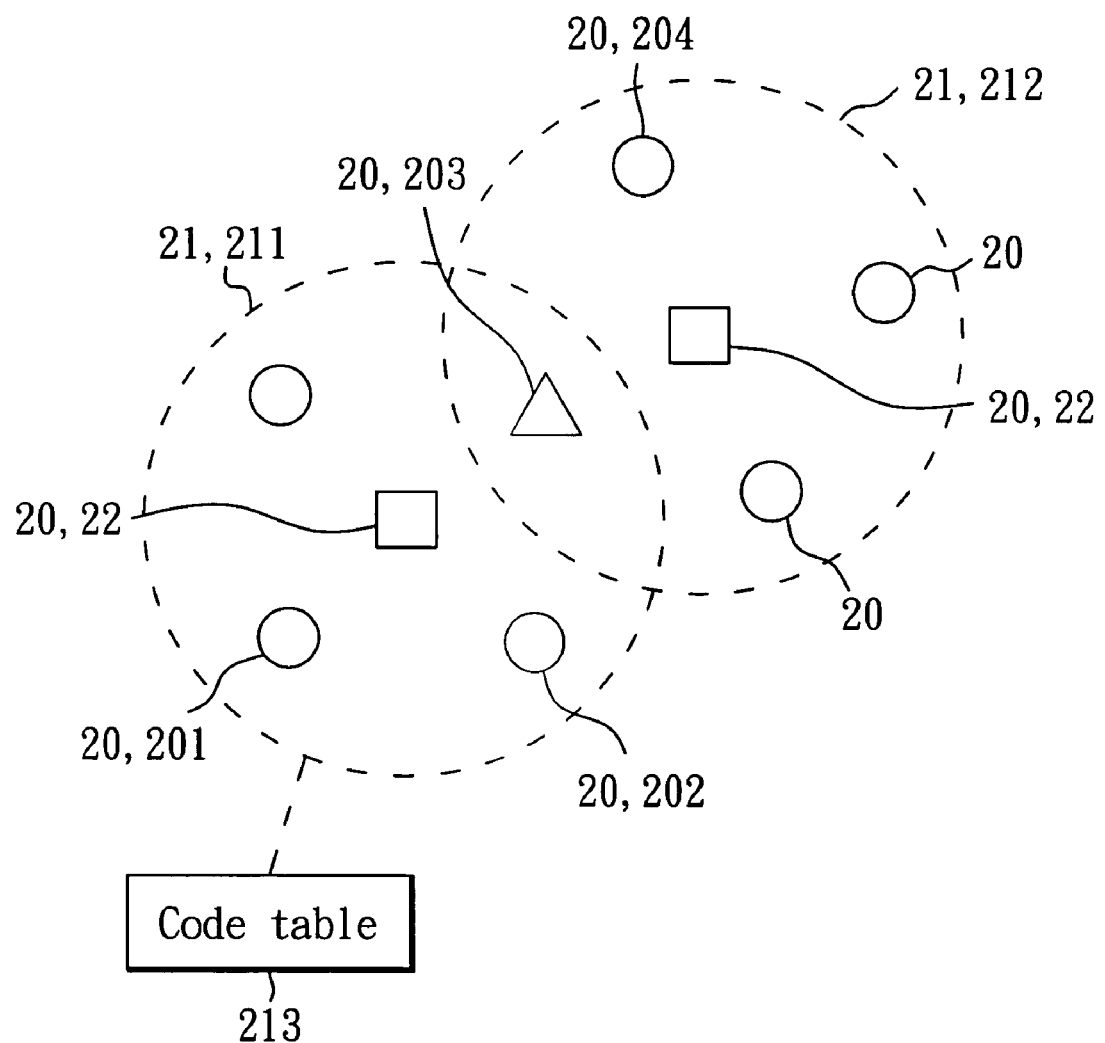
FIG. 2 is a graph of a system configuration applying a channel assigning method for an ad-hoc network according to the invention.

FIG. 2 is a system configuration applying a channel assigning method for ad-hoc network according to the invention. In FIG. 2, all mobile nodes (MNs) 20 in the ad-hoc network are grouped into several clusters 21. Mobile nodes 20 in each cluster 21 can be grouped into three roles: cluster head, gateway node and ordinary node. Each cluster 21 has only one cluster head 22 that has a one-hop distance from any of other mobile nodes 20 in the same cluster 21. Namely, one mobile node has at most two-hop distance from other mobile nodes 20 in a same cluster 21. Also, each cluster 21 defines a common code different from its adjacent clusters such that all mobile nodes 20 in the cluster 21 can use the common code to encode and send their transmitting packets to one another without causing interference from adjacent cluster. There exists at least one gateway node 203 between two clusters 211 and 212 for communication. Namely, the gateway node 203 in the cluster 211 has a one-hop distance from at least one mobile node 220 of its adjacent cluster 212. The mobile nodes 20 in the ad-hoc network apply half-duplex for transmission, in which any of the mobile nodes 20 can only transmit or receive packets at a time.

Figure 3:
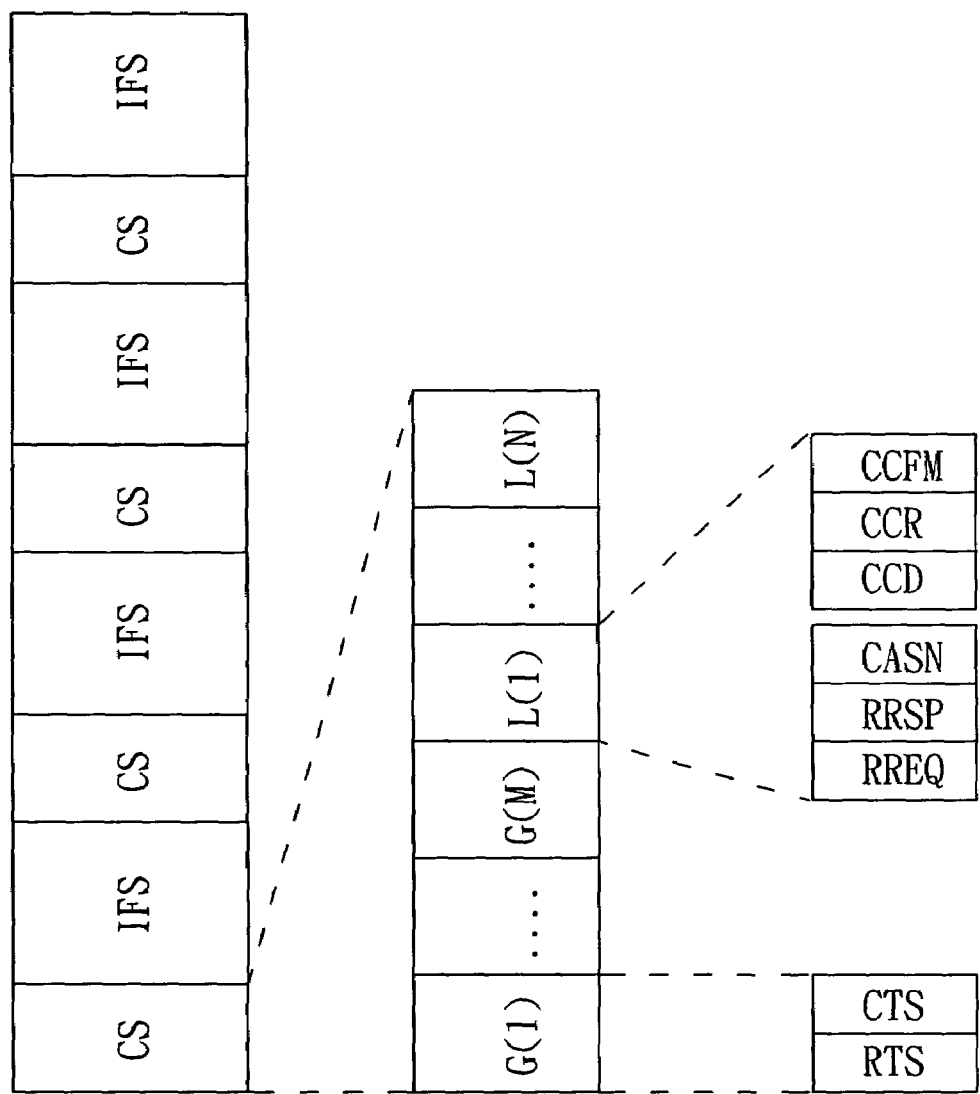
FIG. 3 is a block of a frame structure defined by a timing of a channel assigning method according to the invention.

In the ad-hoc network, a wireless channel is dynamically established among the nodes 20 to transmit and receive their packets. The wireless channel is defined by a time slot and a code, wherein the time slot consists of a control slot (CS) and an information slot (IFS). The time slot is defined in a timing such that all nodes 20 can follow the timing to transmit and receive their packets. FIG. 3 is a block of a frame structure defined by the timing. The frame structure includes alternate CS and IFS, wherein a mobile node 20 can transmit and receive its control packet in a CS and its data packet in an IFS. As shown in FIG. 3, the CS further has multiple global sub-control slots G(i), i=1, . . . ,M (for inter-cluster) and multiple local sub-control slots L(j), j= 1, . . . ,N (for intra-cluster). Each global sub-control slot G has a request to send (RTS) phase and a clear to send (CTS) phase. Each local sub-control slot L has a reservation request (RREQ) phase, a reservation response (RRSP) phase, a code assignment (CASN) phase, a code conflict detection (CCD) phase, a code conflict report (CCR) phase and a code confirmation (CCFM) phase.

Figure 4:
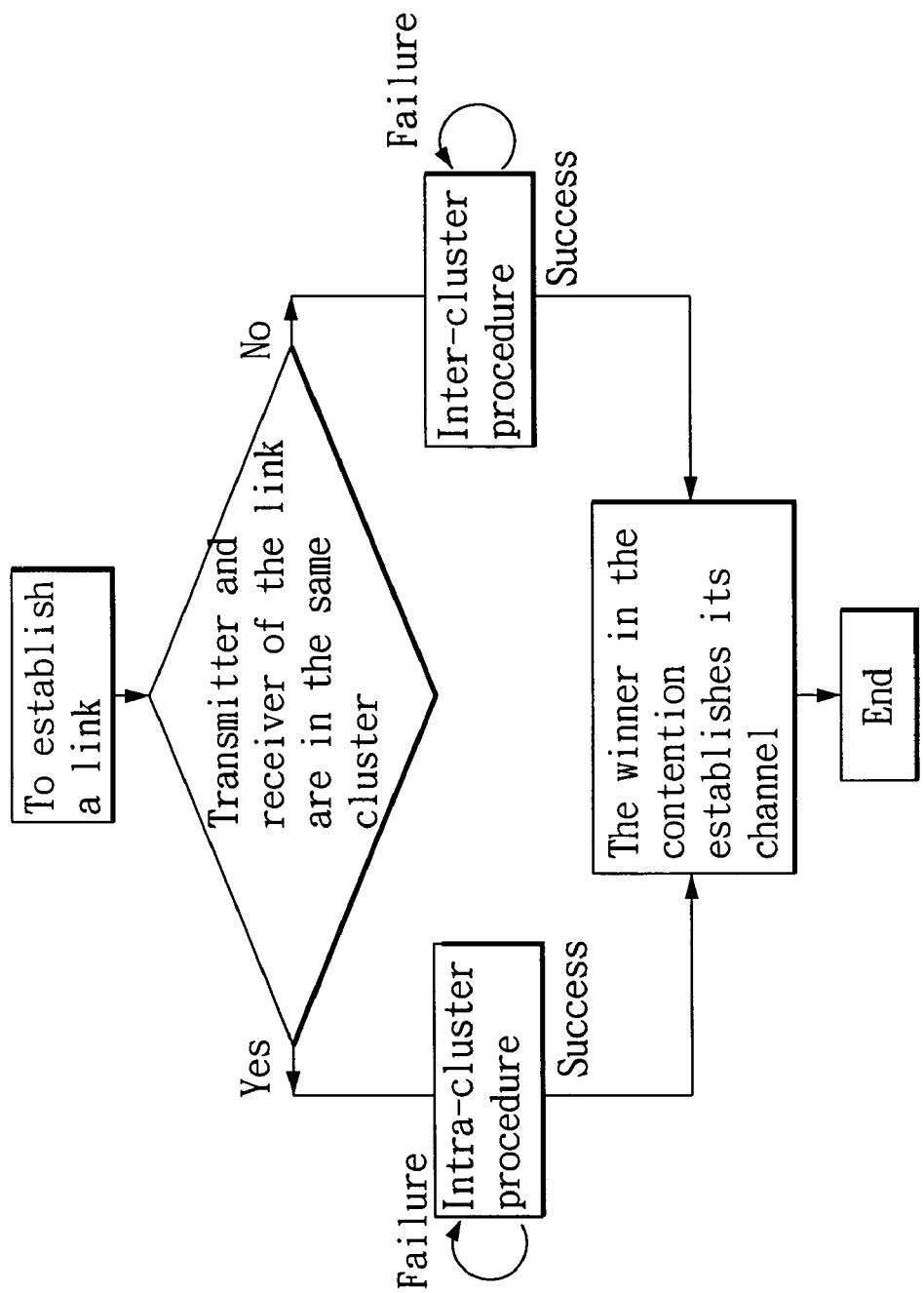
FIG. 4 is a flowchart of a channel assigning method for the ad-hoc network according to the invention.
Figure 5:
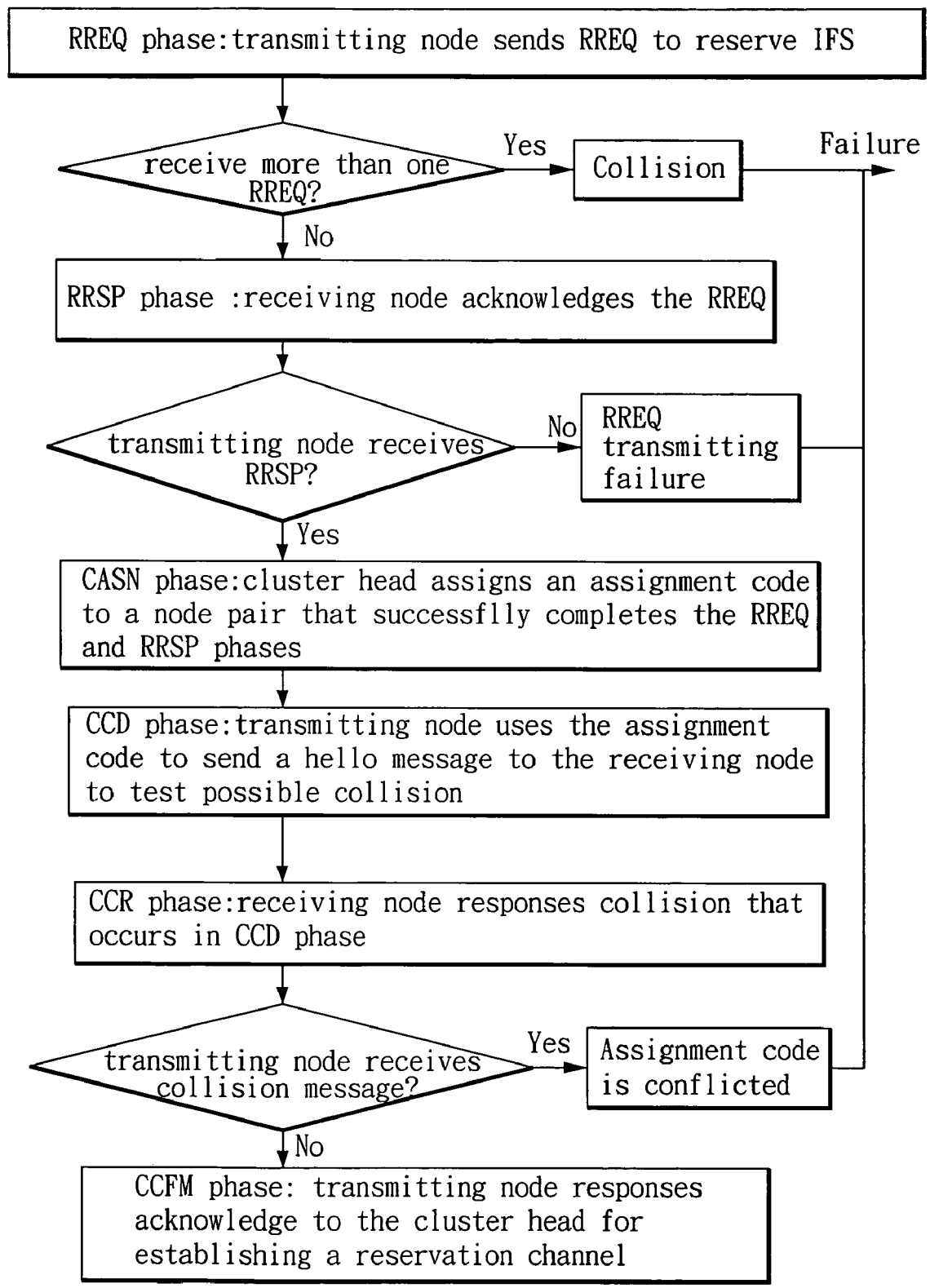
FIG. 5 is a flowchart of using an intra-cluster procedure to perform channel assignment in a local sub-control slot according to the invention.

FIG. 4 is a flowchart of a channel assigning method for the ad-hoc network of FIG. 2 according to the invention. Referring to FIGS. 2 and 4, when a mobile node 20 intends to establish a link for data transmission, an intra-cluster procedure is performed when the transmitter and receiver of the link are in a same cluster 21, or an inter-cluster procedure is performed when the transmitter and receiver of the link are not in the same cluster 21. The intra-cluster procedure uses the local sub-control slot L in contention and then allows a winner to establish its channel to further use the IFS to send data. The inter-cluster procedure uses the global sub-control slot G in contention and then allows a winner to establish its channel to further use the IFS to send data. FIG. 5 is a flowchart of using the intra-cluster procedure to perform channel assignment in the local sub-control slot L according to the invention. As shown in FIG. 5, in the RREQ phase, a node 201 to transmit sends an RREQ packet to reserve an information slot. That is, the node 201 uses the common code to encode and send the RREQ packet to a receiving node 202. At this point, other nodes 202 not to transmit apply the common code for receiving the RREQ packet. In the event, a node 202 may receive nothing, one or more RREQ packets from its adjacent nodes. If more than one RREQ packets are received, it indicates that a collision occurs and all RREQ packets are not available.

Next, in the RRSP phase, the receiving node 202 acknowledges the RREQ packet, i.e., when only one RREQ packet is received by the receiving node 202 using the common code, the receiving node 202 then uses the common code to code and send a RRSP packet, thereby noticing the successful reception. At the same time, the cluster head 22 in the clusters 21 uses the common code to receive the RRSP packet. Accordingly, the node 201 to transmit can determine that the RREQ packet is sent successfully; otherwise, the RREQ packet fails.

In the CASN phase, the cluster head 22 detecting the RRSP packet sent in the RRSP phase assigns an assignment code to a node pair that successfully completes the RREQ and RRSP phases. That is, the cluster head 22 selects an appropriate assignment code, such as $C_1$, from a code table 213 with respect to its cluster 211 in case that previously at least one RRSP packet is received or an RRSP packet is sent. Next, the cluster head 22 broadcasts the information of the assignment code $C_1$ by the common code. The node 201 to transmit and its receiving node 202 receive the information of the assignment code by the common code.

In the CCD phase, the node 201 uses the assignment code assigned to send a hello message to the receiving node 202. At this point, the receiving node 202 needs use the assignment code to receive packets, thereby testing any possible collision caused by assigning the assignment code. Other nodes that have no task are idle. That is, the node 201 uses the assignment code $C_1$ to send a hello message. All nodes within its effective transmission area that use the code $C_1$ in communication can receive the hello message. Also, transmitting terminals having established links in the ad-hoc network use respective assignment codes $C_x$ to send a hello message. In this case, the receiving node 202 may receive one or more hello messages. When more than one hello messages are received, it indicates a code assigning conflict, which represents that the assignment code is also assigned to at least one node of an adjacent cluster, so that an inter-cluster hidden terminal collision occurs.

In the CCR phase, the receiving node 202 responses whether or not a collision occurs in the CCD phase. Namely, in case of receiving plural hello messages, the receiving node 202 uses the assignment code $C_1$ to send a collision message to notice the collision occurrence. That is, according to the collision message received or not, the node 201 can determine if the assignment code meets with the inter-cluster hidden terminal collision.

In the CCFM phase, if the node 201 has no collision in the CCR phase, it responses an acknowledgement to the cluster head 22 for establishing a reservation channel. That is, if the collision message is not received, the node 201 uses the common code to transmit an acknowledgement and the cluster head 22 uses the common code to receive the acknowledgement, thereby confirming that the assignment code $C_1$ is assigned successfully to the nodes 201 and 202. Thus, the assignment code $C_1$ is released from the coding table 213. As such, the nodes 201 and 202 can use the assignment code $C_1$ in every IFS to transmit and receive data packets without link interference.

Figure 6:
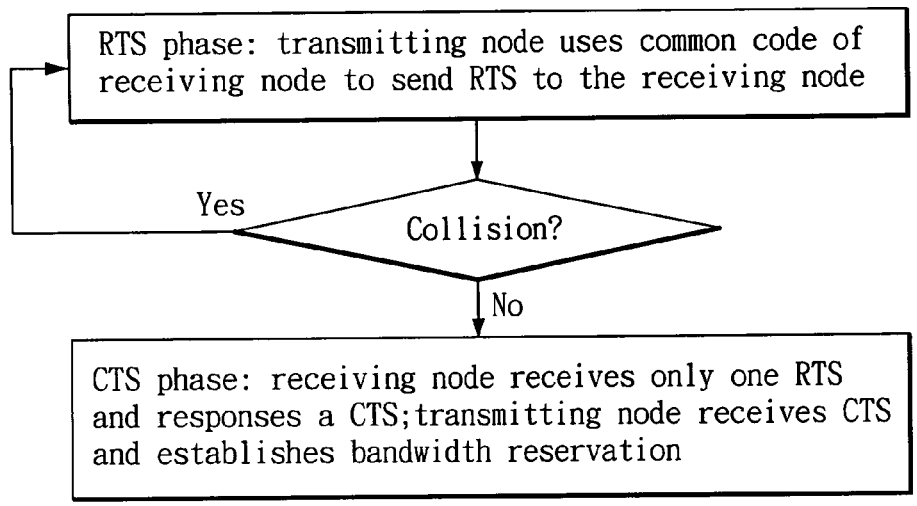
FIG. 6 is a flowchart of a bandwidth reservation between adjacent clusters in a global sub-control slot according to the invention.

FIG. 6 is a flowchart about the inter-cluster procedure, especially for performing a bandwidth reservation between adjacent clusters 211 and 212 in a global sub-control slot G for a node 202 according to the invention. As shown in FIG. 6, in the RTS phase, when a node 203 to transmit, which is a gateway node or cluster head of the cluster 211, intends to send a packet to a receiving node 204 of the adjacent cluster 212, it uses a common code of the receiving node 204 to send an RTS message to the receiving node 204 in a next global sub-control slot, and other nodes 20 not to receive data receives packets by respective common codes of their clusters.

If another transmitting node of a different cluster or even the same cluster also sends an RTS message in the next global sub-control slot, the receiving node 204 has a collision and causes a transmitting failure. As cited, the node 203 to transmit needs re-contention in a next time. For example, the node 203 idles a random delay time, and then re-sends an RTS message in a coming global sub-control slot.

In the CTS phase, if the receiving node 204 receives only one RTS message, it uses its common code to send a CTS message for acknowledgement. In this case, the node 203 sending the only one RTS message receives the CTS message with the common code of the receiving node 204 and accordingly ensures establishment of required bandwidth reservation, thereby transmitting data by the common code of the receiving node 204.

Figure 7:
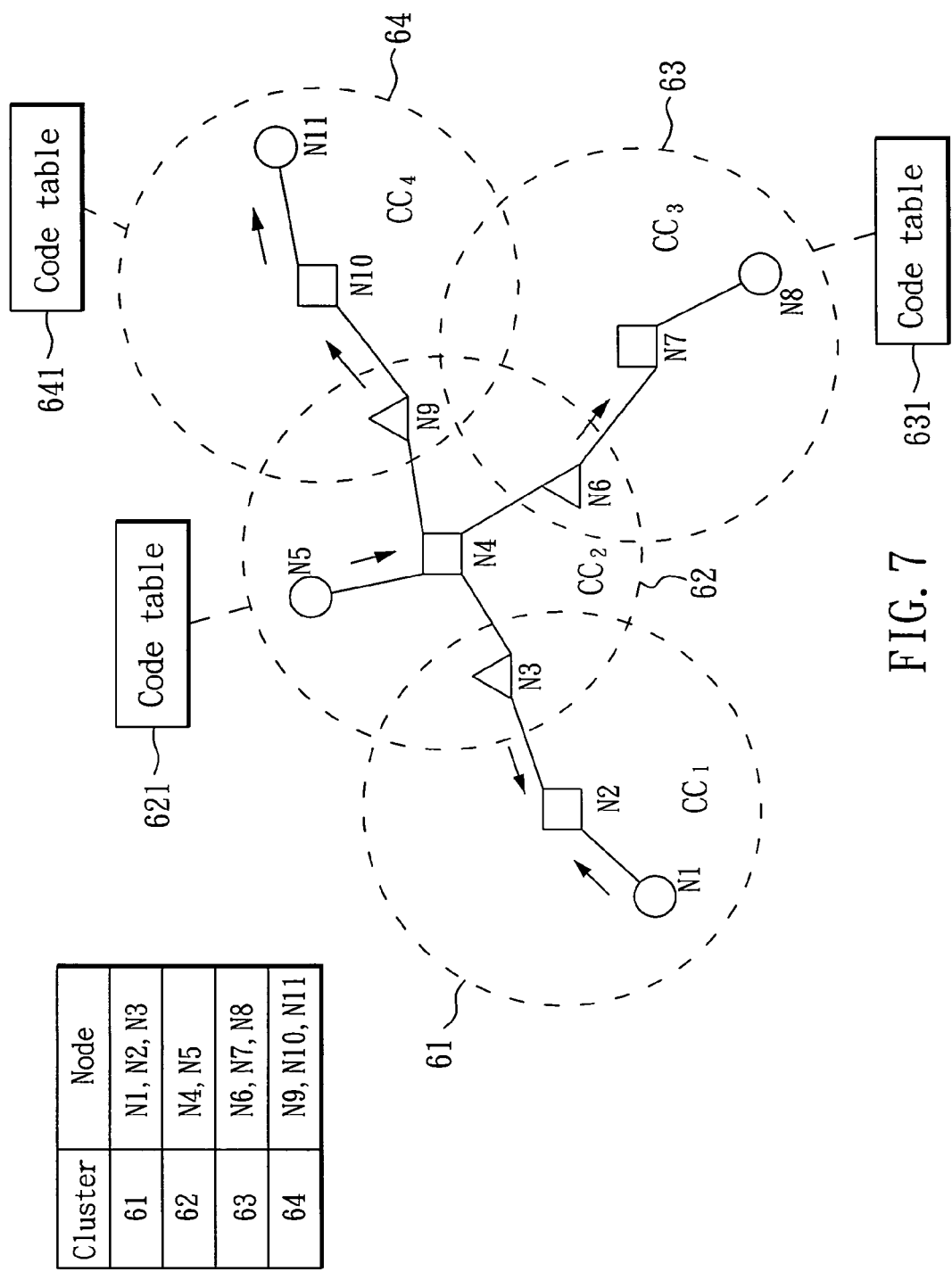
FIG. 7 is an example of the channel assigning method for an ad-hoc network according to the invention.

FIG. 7 is an embodiment of a channel assigning method for an ad-hoc network according to the invention. As shown in FIG. 7, four clusters 61-64 are given. The cluster 61 has nodes N1-N3, wherein N3 is a gateway node. The cluster 62 has nodes N4 and N5. The cluster 63 has nodes N6-N8, wherein N6 is a gateway node. The cluster 64 has nodes N9-N11, wherein N9 is a gateway node. The clusters 61-64 have common codes $CC_1$-$CC_4$ and cluster heads N2, N4, N7, N10 respectively.

FIG. 8 is a table of a six-phase operation in a local sub-control slot L according to the invention, where the six-phase is RREQ, RRSP, CASN, CCD, CCR and CCFM.

Referring to FIGS. 7 and 8, in the RREQ phase, the node N1 uses its common code $CC_1$ to encode and send an RREQ packet to the node N2; the node N3 uses its common code $CC_1$ to encode and send an RREQ packet to the node N2, the node N5 uses its common code $CC_2$ to encode and send an RREQ packet to the node N4, the node N6 uses its common code $CC_3$ to encode and send an RREQ packet to the node N7, the node N10 uses its common code $CC_4$ to encode and send an RREQ packet to the node N11, and the node N9 uses its common code $CC_4$ to encode and send an RREQ packet to the node N10. In this case, since the node N10 also sends its RREQ packet, it cannot receive the RREQ packet sent by the node N9 under the half-duplex mode. Therefore, it is known that the nodes N2, N4, N7 and N11 are receiving nodes.

In the RRSP phase, the receiving node N2 fails due to two RREQ packets received while other receiving nodes N4, N7 and N11 respectively receive only one RREQ packet. Therefore, the node N4 uses its common code $CC_2$ to encode and send an RRSP packet to the node N5 having a one-hop distance from the node N4. The node N7 uses its common code $CC_3$ to encode and send an RRSP packet to the nodes N6 and N8, each having a one-hop distance from the node N7. The node N11 uses its common code $CC_4$ to encode and send an RRSP packet to the node N10 having a one-hop distance from the node N11.

In the CASN phase, the node N4 previously sending the RRSP packet finds an assignment code $C_1$ from its code table 621 and uses its common code $CC_2$ to encode and send the information of assignment code $C_1$ to the node N5 having a one-hop distance from the node N4. The node N7 previously sending the RRSP packet finds the assignment code $C_1$ from its code table 631 and uses its common code $CC_3$ to encode and send the information of assignment code $C_1$ to the nodes N6 and N8, each having a one-hop distance from the node N7. The node N10 previously sending the RRSP packet finds an assignment code $C_2$ from its code table 641 and uses its common code $CC_4$ to code and send the assignment code $C_2$ to the nodes N9 and N11, each having a one-hop distance from the node N10.

In the CCD phase, the node N5 to transmit uses the assignment code $C_1$ to send a hello message to the node N4 having a one-hop distance from the node N5. The node N6 to transmit uses the assignment code $C_1$ to send a hello message to the nodes N4 and N7, each having a one-hop distance from the node N6. The node N1 to transmit uses the assignment code $C_2$ to send a hello message to the node N11 having a one-hop distance from the node N10. Other nodes having no task are idle.

In the CCR phase, the node N4 sends a collision message to the nodes N5 and N6, each having one-hop distance from the node N4, due to two hello messages received by the assignment code $C_1$. In this case, a collision analysis procedure is applied to the nodes N5 and N6 for determining a communicable node. For example, based on a rule of a cluster head precedent to an ordinary node or a linked node precedent to a collided node, the node N6 is selected first.

In the CCFM phase, the node N6 selected prior to the node N5 ignores the collision message received and uses its common code $CC_3$ to encode and send an acknowledgement to the node N7. The node N7 accordingly confirms no collision caused by the assignment code $C_1$ and further assigns the assignment code $C_1$ to the nodes N6 and N7 for packet transmission. In addition, the node N10 does not receive any collision message and accordingly uses its common code $CC_4$ to encode and send an acknowledgement to the nodes N9 and N11. The node N10 as a cluster head directly confirms no collision caused by the assignment code $C_2$ and further assigns the assignment code $C_2$ to the nodes N10 and N11 for packet transmission.

Figure 9:
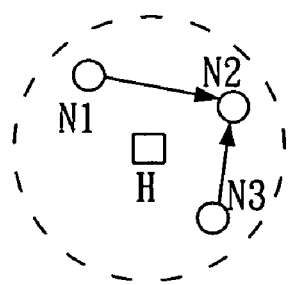
FIG. 9 shows graphs of all possible cases of RREQ links in two clusters with respect to a cluster head according to the invention.
Figure 9:
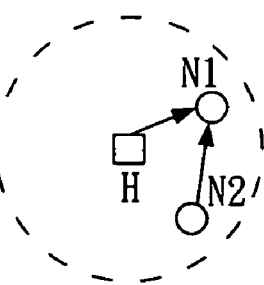
Figure 9:
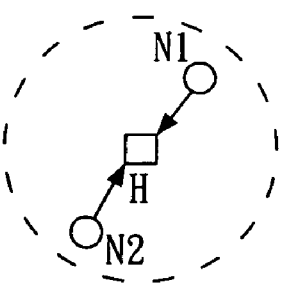
Figure 9:
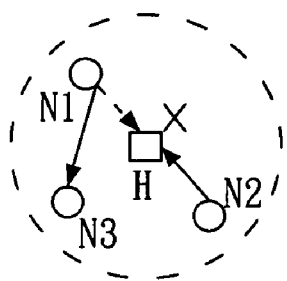
Figure 9:
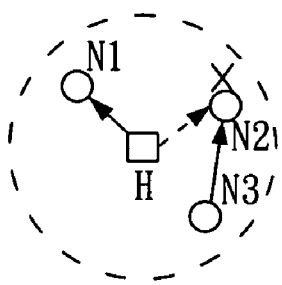
Figure 9:
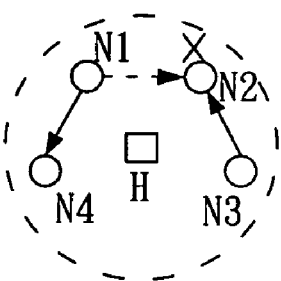
Figure 9:
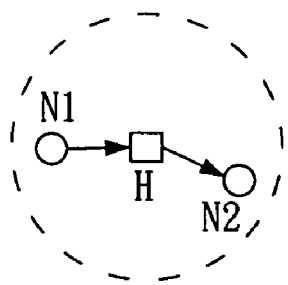
Figure 9:
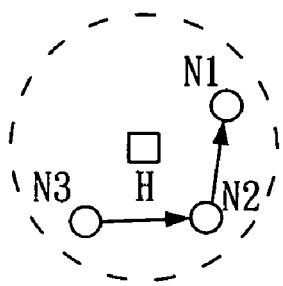
Figure 9:
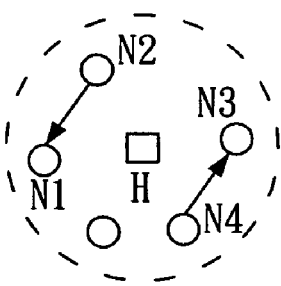

As cited, the method of the present invention can ensure that the intra-cluster or inter-cluster does not have co-channel interference and hidden terminal problem. FIG. 9 shows all possible cases where the cluster head H may be with respect to RREQ for two intra-cluster links. For each case, behaviors of the cluster head H show in the first three phases, i.e., RREQ, RRSP and CASN. As shown in FIG. 9(A), in the RREQ phase, nodes N1 and N3 respectively send an RREQ packet to a node N2, thus the cluster head H receives the two RREQ packets; in the RRSP phase, the node N2 detects collision due to the two RREQ packets received, thus the cluster head H does not receive any RRSP packet and accordingly performs no action in the CASN phase.

As shown in FIG. 9(B), in the RREQ phase, the cluster head H sends an RREQ packet to the node N1 (in this case, the node N2 also sends an RREQ packet to the node N1); in the RRSP phase, the node N1 detects collision due to the two RREQ packets received, thus the cluster head H does not receive any RRSP packet and accordingly has no action in the CASN phase.

As shown in FIG. 9(C), in the RREQ phase, since the nodes N1 and N2 respectively send an RREQ packet to the cluster head H, the cluster head H receives the two RREQ packets; in the RRSP phase, the cluster head H detects collision due to the two RREQ packets received and thus does not send any RRSP packet; and accordingly, in the CASN phase, the cluster head H performs no action.

As shown in FIG. 9(D), in the RREQ phase, since the node N1 sends an RREQ packet to the node N3 and the node N2 sends an RREQ packet to the cluster head H, the cluster head H receives the two RREQ packets; in the RRSP phase, the cluster head H detects collision due to the two RREQ packets received and thus does not send any RRSP packet, but the node N1 sends an RRSP packet to the cluster head H; and accordingly, in the CASN phase, the cluster head H selects an assignment code from its code table to a link established between the nodes N1 and N3.

As shown in FIG. 9(E), in the RREQ phase, the cluster head H sends an RREQ packet to the node N1 (in this case, the node N3 also sends an RREQ packet to the node N2); in the RRSP phase, the node N2 detects collision due to the two RREQ packets received, and the cluster head H receives only an RRSP packet sent by the node N1; and accordingly in the CASN phase, the cluster head H selects an assignment code from its code table to a link established between the cluster head H and the node N1.

As shown in FIG. 9(F), in the RREQ phase, since the node N1 sends an RREQ packet to the node N4 and the node N3 sends an RREQ packet to the node N2, the cluster head H receives the two RREQ packets; in the RRSP phase, the node N2 detects collision due to the two RREQ packets received, and the cluster head H receives only an RRSP packet sent by the node N4; and accordingly, in the CASN phase, the cluster head H selects an assignment code from its code table to a link established between the nodes N1 and N4.

As shown in FIG. 9(G), in the RREQ phase, the cluster head H sends an RREQ packet to the node N2 (in this case, the node N1 also sends an RREQ packet to the cluster head H); in the RRSP phase, the cluster head H receives only an RRSP packet sent by the node N2; and accordingly in the CASN phase, the cluster head H assigns an assignment code to a link established between the cluster head H and the node N2.

As shown in FIG. 9(H), in the RREQ phase, since the node N2 sends an RREQ packet to the node N1 and the node N3 sends an RREQ packet to the node N2, the cluster head H receives the two RREQ packets; in the RRSP phase, the cluster head H receives only an RRSP packet sent by the node N1; and accordingly, in the CASN phase, the cluster head H selects an assignment code from its code table to a link established between the nodes N1 and N2.

As shown in FIG. 9(I), in the RREQ phase, since the node N2 sends an RREQ packet to the node N1 and the node N4 sends an RREQ packet to the node N3, the cluster head H receives the two RREQ packets; in the RRSP phase, the cluster head H receives RRSP packets respectively sent by the nodes N3 and N2; and accordingly, in the CASN phase, the cluster head H assigns one assignment code to the link established between the nodes N1 and N2 and the link established between the nodes N3 and N4. In this case, it is described that two separate links can exist concurrently in a same cluster, without mutual interference.

Figure 10:
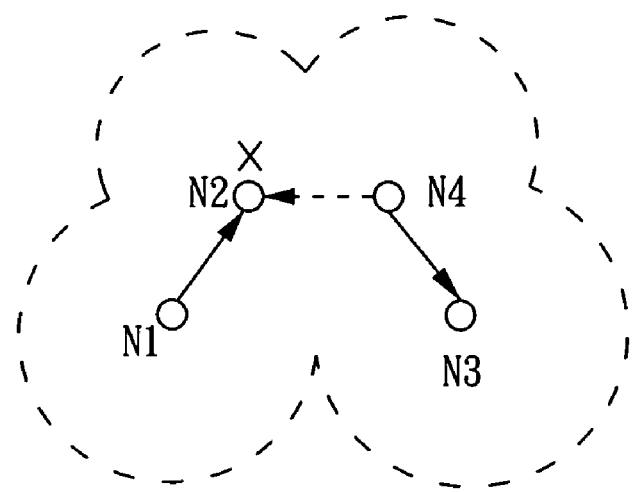
FIG. 10 shows graphs of channel establishment cases as link interference occurs in two adjacent clusters according to the invention.
Figure 10:
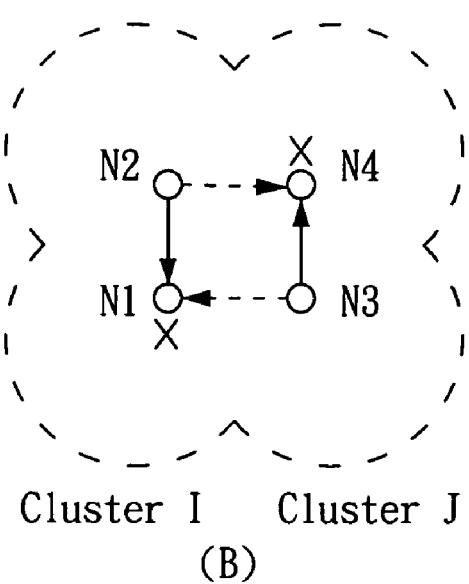

From FIG. 9(A) to FIG. 9(I), it is known that the method of the present invention applies the first three phases to avoid the collisions caused by the intra-cluster link interference. Next, collisions caused by inter-cluster link interference are to be avoided by the method applying the last three phases. FIG. 10 shows channel establishment cases as link interference occurs in two adjacent clusters according to the invention. As shown in FIG. 10(A), a link interference between adjacent clusters I and J is caused by concurrently establishing both a link between nodes N1 and N2 in the cluster I, referred to as an N1-N2 link, and a link between nodes N3 and N4 in the cluster J, referred to as an N3-N4 link. The assignment code of N1-N2 link and N3-N4 link are the same. In this case, a collision is detected in the CCD phase, next the N3-N4 link is determined as a success in the CCR phase, and finally an assignment code assigned to the N3-N4 link is confirmed in the CCFM phase. In addition, if the N1-N2 link and the N3-N4 link are not established concurrently and the N1-N2 link is established earlier than the N3-N4 link, a collision is detected in the CCD phase. In the CCR phase, the node N4 receives the collision and thus the N3-N4 link fails (at this point, the N1-N2 link exists). Accordingly, the CCFM phase has no action. On the contrary, if the N3-N4 link is established earlier than the N1-N2 link, a collision is detected in the CCD phase. In the CCR phase, the node N1 receives the collision and thus the N1-N2 link fails (at this point, the N3-N4 link exists). Accordingly, the CCFM phase has no action.

As shown in FIG. 10(B), two link interferences between adjacent clusters I and J are caused by concurrently establishing both the N1-N2 link and the N3-N4 link. In this case, a collision is detected in the CCD phase, next both the N1-N2 link and the N3-N4 link are determined as a failure in the CCR phase, and finally the CCFM phase has no action. Both N1-N2 link and N3-N4 use the same assignment code. In addition, if the N1-N2 link and the N3-N4 link are not established concurrently and the N1-N2 link is established earlier than the N3-N4 link, a collision is detected in the CCD phase. In the CCR phase, the node N1 and the node N4 respectively receive the collision and thus the N3-N4 link fails (at this point, the N1-N2 link exists). Accordingly, the CCFM phase has no action. By contrary, if the N3-N4 link is established earlier than the N1-N2 link, a collision is detected in the CCD phase. In the CCR phase, the node N1 and the node N4 respectively receive the collision and thus the N1-N2 link fails (at this point, the N3-N4 link exists). Accordingly, the CCFM phase has no action.

From FIGS. 10 (A) and (B), it is known that the method of the present invention applies the last three phases, i.e., CCD, CCR and CCFM, to interference(s) caused by assigning same assignment code(s) to adjacent clusters for eliminating the same assignment code(s), thereby establishing required channels without any collision.

In view of the foregoing, it is known that the channel assigning method of the present invention applies both the intra-cluster six-phase bandwidth reserving procedure and the inter-cluster RTS-CTS dialogue protocol to establish required TDMS slots and select required assignment codes, thereby realizing the object of supporting real-time transmission in a multi-hop ad-hoc network. In the six-phase bandwidth reserving procedure, the first three phases can overcome the intra-cluster collision(s) and the remaining phases can overcome the inter-cluster collision(s) caused by assigning same assignment code(s) to adjacent clusters, thereby ensuring no assignment code collision and hidden terminal problem. Thus, any interference is avoided to further provide the QoS guarantee. In addition, the method of the present invention dynamically selects an assignment code, thereby ensuring each assignment code a preferred utility.

Although the present invention has been explained in relation to its preferred embodiment, it is to be understood that many other possible modifications and variations can be made without departing from the spirit and scope of the invention as hereinafter claimed.

What is claimed is:

1. A channel assigning method for ad-hoc network, the ad-hoc network having multiple mobile nodes grouped into clusters, each cluster defining: one of its mobile nodes as a cluster head that has a one-hop distance from any of other mobile nodes in the cluster; a wireless channel between transmitting and receiving mobile nodes to transmit and receive packets, wherein the wireless channel is defined by a slot and a code, and the slot consists of a control slot and an information slot such that a mobile node transmits and receives control packets in the control slot for contention so as to transmit and receive data packets in the information slot; and a common code such that all mobile nodes in the cluster use the common code to transmit and receive their packets; when a mobile node intends to transmit data to a mobile node in a same cluster, the method performing an intra-cluster procedure, comprising:

a reservation request (RREQ) phase in which the transmitting mobile node sends a RREQ packet for reserving information slot for transmitting and receiving data packets;

a reservation response (RRSP) phase in which a receiving mobile node acknowledges the RREQ packet by responding an RRSP packet;

a code assignment (CASN) phase in which the cluster head that receives the RRSP packet assigns an assignment code to the transmitting and receiving mobile nodes;

a code conflict detection (CCD) phase in which the transmitting mobile node, which is assigned with the assignment code, uses the assignment code to send a hello message to its corresponding receiving mobile node for finding possible collisions caused by the assignment code;

a code conflict report (CCR) phase in which the receiving mobile node acknowledges the possible collisions respectively; and a code confirmation (CCFM) phase in which the transmitting mobile node that detects no collision responses an acknowledgement to the cluster head for confirming the assignment code and establishing a reservation channel.

2. The method as claimed in claim 1, wherein in the RREQ phase, the transmitting mobile node uses the common code to encode and send the RREQ packet to the receiving mobile node.

3. The method as claimed in claim 2, wherein in the RREQ phase, other mobile nodes that do not transmit data use their respective common codes to receive the RREQ packet.

4. The method as claimed in claim 1, wherein in the RRSP phase, if the receiving mobile node receives only one RREQ packet, the receiving mobile node uses the common code to send the RRSP packet, and the cluster head uses the common code to receive the RRSP packet.

5. The method as claimed in claim 1, wherein in the CASN phase, if the cluster head receives at least one preceding RRSP packet or sends a preceding RRSP packet, it uses the common code to encode and send the assignment code, and the transmitting mobile node and receiving mobile node use their common codes respectively to receive the assignment code.

6. The method as claimed in claim 1, wherein in the CCD phase, when the transmitting mobile node, which is assigned with the assignment code, uses the assignment code to send a hello message, any transmitting mobile node at a link established in the ad-hoc network also uses its assignment code to send a hello message.

7. The method as claimed in claim 6, wherein in the CCD phase, other mobile nodes that have no task are idle.

8. The method as claimed in claim 1, wherein in the CCR phase, the receiving mobile node uses its assignment code to send a collision message when plural hello messages are received.

9. The method as claimed in claim 8, wherein in the CCR phase, any of mobile nodes in the ad-hoc network that has established a link uses its assignment code to send the collision message when plural hello messages are received.

10. The method as claimed in claim 9, wherein in the CCR phase, a collision analysis procedure is used to determine a communicable mobile node among all mobile nodes that send the collision message.

11. The method as claimed in claim 10, wherein the collision analysis procedure selects the communicable mobile based on a rule of a link-established mobile node precedent to a collided mobile node.

12. The method as claimed in claim 10, wherein the collision analysis procedure selects the communicable mobile based on a rule of a cluster head precedent to an ordinary node.

13. The method as claimed in claim 1, wherein in the CCFM phase, the mobile node uses the common code to encode and send the acknowledgement, and the cluster head uses the common code to receive the acknowledgement to accordingly confirm that the assignment code is successfully assigned to both the mobile node and the receiving mobile node for establishing the reservation channel to send packets so as to release the assignment code.

14. The method as claimed in claim 1, wherein when a transmitting mobile node intends to transmit data to a receiving mobile node in an adjacent cluster, the method performing an inter-cluster procedure, comprising:
- a request to send (RTS) phase in which the transmitting mobile node uses the common code of the receiving node to send a RTS message to the receiving mobile node; and
- a clear to send (CTS) phase in which when the receiving mobile node receives only one RTS message, the receiving mobile node uses its common code to send a CTS message for acknowledgement of successfully receiving RTS, thereby establishing required bandwidth reservation.

15. The method as claimed in claim 14, wherein in the RTS phase, other mobile nodes in the clusters that do not transmit data use their respective common codes to receive packets.

16. The method as claimed in claim 1, wherein the common codes defined in adjacent clusters are different.

* * * * *